(12) United States Patent
Beck

(10) Patent No.: US 6,839,616 B2
(45) Date of Patent: Jan. 4, 2005

(54) MONITORING DEVICE FOR A HARVESTING MACHINE

(75) Inventor: Folker Beck, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/039,647

(22) Filed: Jan. 7, 2002

(65) Prior Publication Data

US 2002/0091476 A1 Jul. 11, 2002

(30) Foreign Application Priority Data

Jan. 8, 2001 (DE) .......................... 101 00 521

(51) Int. Cl.⁷ .......................... A01D 75/18; G06F 19/00
(52) U.S. Cl. ..................... 701/50; 56/10.2 R
(58) Field of Search .................. 701/49, 50; 56/16.6, 56/10.2 R, 13.3, 14.7, 15.5; 172/4.5, 9; 141/231, 250

(56) References Cited

U.S. PATENT DOCUMENTS

| | | | |
|---|---|---|---|
| 3,610,252 A | 10/1971 | DeCoene et al. | 130/24 |
| 4,266,421 A | 5/1981 | McDougal | 73/1 DV |
| 4,275,546 A * | 6/1981 | Bohman et al. | 460/2 |
| 6,125,702 A | 10/2000 | Kuchar | 73/579 |
| 6,146,268 A | 11/2000 | Behnke et al. | 460/4 |
| 6,192,664 B1 * | 2/2001 | Missotten et al. | 56/10.2 R |

FOREIGN PATENT DOCUMENTS

| | | |
|---|---|---|
| BG | 33743 | 5/1983 |
| DE | 31 00 045 C2 | 1/1982 |
| EP | 0 452 544 A2 | 10/1991 |

* cited by examiner

Primary Examiner—Michael J. Zanelli

(57) ABSTRACT

A monitoring device for a harvesting machine comprises at least one sensor that is designed for generating a signal containing information on the noises caused by harvested crop material as it passes through a crop processing assembly. The sensor is spaced apart from and outside the flow of harvested crop material through the crop processing assembly.

21 Claims, 1 Drawing Sheet

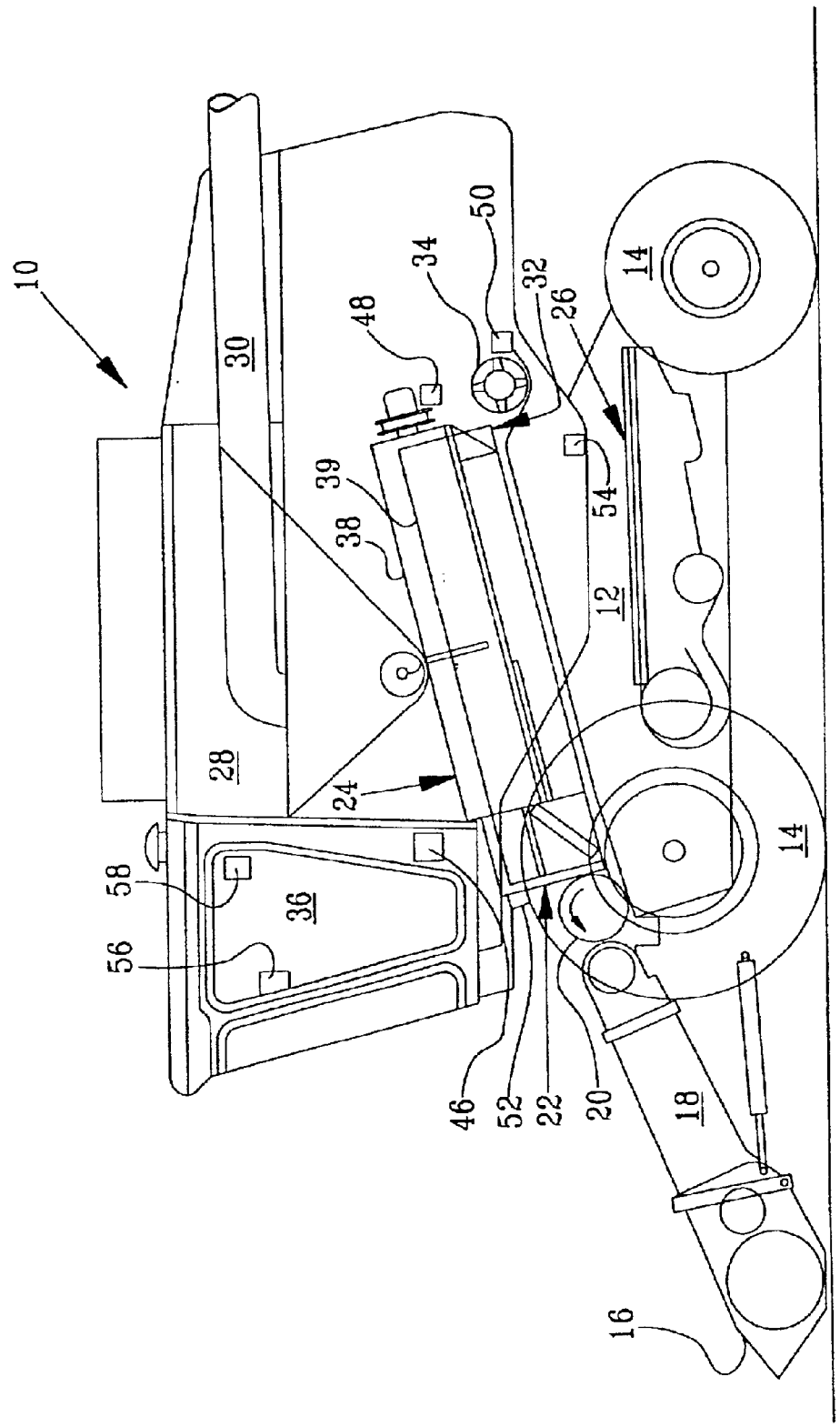

MONITORING DEVICE FOR A HARVESTING MACHINE

FIELD OF THE INVENTION

The present invention is directed to a monitoring device for a harvesting machine having at least one sensor that generates a signal containing information on the noises caused by constituents of the material being harvested which pass through the harvesting machine.

BACKGROUND OF THE INVENTION

Agricultural machines are increasingly equipped with more elaborate soundproof cabs in order to protect the operator from environmental influences. In such instances, the operator is provided with information on the machine status in different ways, for example, in the form of warning indicators for rotational speeds and the pressure of the hydraulic fluid. Due to the sound insulation of the cabin, the operator cannot monitor and control the function of the machine as well as with machines that have an open workstation, namely because the ability of the operator to perceive the noises caused by the flow of material being harvested through the machine is diminished.

BG 33 743 describes a device for mechanically examining working elements of a grape picking machine. The vibrations of the device are measured and displayed on an oscillograph.

It is also known (e.g., from EP 0 452 544 A) to provide combine harvesters with vibration sensors that sense the sound waves caused by lost grain. The signals of the vibration sensors are evaluated and used for displaying the loss portion. In this case, it is disadvantageous that the vibration sensor lies in and consequently impairs the flow of material.

SUMMARY

It is one of the object of the present invention to provide an improved device for monitoring the functions of an agricultural harvesting machine.

The invention equips a harvesting machine with a monitoring device that contains a sensor which is arranged outside of the flow of material being harvested. Consequently, the material being harvested does not directly impact on the sensor as is the case with known structure-borne noise sensors for measuring lost grain. The sensor is spaced apart from the region in which the material being harvested moves through the machine and senses the acoustic vibrations of the air which are caused by the constituents of the material being harvested and/or elements of the harvesting machine. The sensor may be arranged at arbitrary locations in the harvesting machine, for example, laterally adjacent to the flow of material, above the flow, or beneath the flow. This makes it possible to gain information whether the flow of material moves through the harvesting machine in the desired fashion or an undesirable defect has occurred. Such undesirable defect would cause a change in the sound waves produced by the flow of material which can be sensed by the sensor. It is possible to acoustically monitor a significant portion of the path (or the entire path) along which the material being harvested travels through the harvesting machine.

The invention also equips the workstation of the harvesting machine with a sound reproduction device that receives a signal from the sensor. The sound reproduction device can be a loudspeaker, earphones or headphones. The acoustic process monitoring method makes it possible for the operator to gain an acoustic impression of the material flow in arbitrary elements of the working machine. The working machine can be manually adjusted based on this acoustic impression.

Suitable methods may be utilized for filtering characteristic noises out of the frequency spectrum that allow conclusions regarding the respective process conditions. It would be conceivable to superimpose the sensed signals with the signals of a flawlessly operating harvesting machine (or to deduct these signals from the signals of the sensors) and to reproduce the result such that possible defects can be easily detected.

Information on the process status of the harvesting machine which is derived from the signals of the sensors by means of a computer can be displayed to the operator on a visual display device. The signals delivered by the sensor can also be used for automatically adjusting the harvesting machine. For this purpose, the signal of the sensor is digitized and processed with the aid of a computer that typically receives information on the respective adjustments of the harvesting machine via a CAN-bus. The computer then controls the adjustment of actuators of the harvesting machine, for example, the rotational speed of the threshing cylinder, the size of the threshing gap or the speed of the combine itself. In another example, if the sensor signal indicates that stones picked up from the field pass through the harvesting machine based on characteristic noises, the computer is able to raise the harvest pick-up device (cutting mechanism). The signal of the sensor may also serve for monitoring the material flow, for automatically controlling the forward speed of the combine or for monitoring the cutting quality of a cutting mechanism.

The computer preferably utilizes the signal of the sensor and a comparative value in order to generate a signal value that contains information as to the fact whether the machine is operating correctly, whether an adjustment needs to be made or whether a defect has occurred in the harvesting machine. In particularly critical instances that jeopardize the safety of the harvesting machine or may cause severe damage, it is possible to automatically initiate the emergency shut down function. It would also be conceivable to carry out a comparison with noises of a harvesting machine that has known defects, with said noises being recorded. For example, the noises can be compared to noises from an overloaded combine to check for incorrect adjustments of the crop processing elements. It would also be conceivable to utilize the signal of the sensor and the comparative value for generating the signal value; however, it is preferred to reduce the required computing capacity of the computer by deriving a parameter from the sensor signal which parameter serves for generating the signal value in combination with the comparative value. It is preferred to carry out a comparison between the signal (or a parameter derived thereof) and the comparative value. However, other mathematical operations may also be used for generating the signal value.

If the harvesting machine is optimally adjusted, the material flow causes different but typical noises for each type of crop, with said noises being recorded by the sensor or the sensors. The computer evaluates the actually existing noises based on nominal noises that can preferably be selected in dependence on the respective type of crop. Additional or lack of certain noises are analyzed and evaluated. The respective type of crop can be inputted by the operator or determined by means of a corresponding sensor. In light of the large quantity of crop types and harvesting conditions, the monitoring device may be a learning system, e.g., with neuronal networks that learn nominal noises and intelligently react to deviations, i.e., similar to a trained operator.

The sensor signal usually not only contains information on the noises or vibrations caused by constituents of the material being harvested, but also signal portions that are caused by movements and/or vibrations of elements of the harvesting machine. Noteworthy examples in this respect are the material processing elements, e.g., straw walkers, rotors or material conveying elements. These signal portions can also be evaluated in order to detect possible defects or to monitor or control the adjustment of the harvesting machine.

In recent years, it has been attempted in combine harvester research to develop sensors that are intended for measuring grain flow. These sensors usually operate piezoelectrically similar to loss sensors. Their arrangement in the material flow causes clogging problems. The sensor according to the present invention is arranged outside of the material flow may also serve as a grain flow sensor. This may be realized by the sensor sensing the vibrations and noises caused by working elements that are directly engaged with the crop material. The scratching and scraping of crop material is most audible at these locations. Due to the fact that the geometry of the working elements does not have to be significantly changed in order to carry out the structure-borne noise measurement and the fact that the sensor does not lie in the material flow, this type of evaluation of the material flow provides certain advantages. The sensor according to the invention has the advantage that it does not represent an additional obstacle in the material flow as is the case with conventional separating sensors. The sensor according to the invention may be integrated into functional elements of the harvesting machine (e.g., material processing or material conveying elements) or arranged in their vicinity. Noteworthy examples in this respect are sensors on the threshing concave, the separating grate, the feeder house or the straw chopper of a combine harvester.

An acoustic sensor (microphone) or a vibration sensor in the form of a structure-borne noise sensor is preferably utilized as the sensor that delivers information on the acceleration acting upon the sensor or its speed or position. The sensor senses sound waves generated by the material being harvested. It is also possible to utilize sensors which sense structure-borne noise that propagates in or is absorbed by parts of the harvesting machine, for example, in sheet metal, frame elements or other (in particular, supporting) parts. These parts also collect the structure-borne noise caused by many functional elements of the harvesting machine and the material being processed. Suitable analytical methods (e.g., Fourier analysis) make it possible to assign the different sound portions to the individual functional elements of the harvesting machine and to the material flow. In this case, correlated signal portions are usually assigned to the functional elements of the harvesting machine, with uncorrelated signal portions being assigned to the material flow.

The comparative value of the signal (or a parameter of the signal) of the sensor can be stored, e.g., in a ROM. However, since the noises in a harvesting machine may change over time and frequently also depend on the type of material being processed, a static comparative value may lead to incorrect defect messages. Consequently, it is preferred to record the signals of the sensors while the machine operates flawlessly, for example, at the beginning of a working process, and to store the sensor signals in a memory that is connected to the computer as the comparative value. The computer may also contain a neural network that is able to autonomously learn the spectrum of a flawlessly operating working machine.

The monitoring device according to the invention may, in principle, be used in any agricultural harvesting machine. Examples in this respect are self-propelled harvesting machines such as combine harvesters, beet and potato lifters, field choppers and cotton picking machines. However, they may also be used in towed or attached harvesting machines or their attachments, for example, on harvesting attachments such as corn picking machines, corn gatherer or cutting mechanisms.

BRIEF DESCRIPTION OF THE DRAWINGS

FIG. 1 is a semi-schematic side view of a harvesting machine.

DETAILED DESCRIPTION

FIG. 1 shows a schematic side view of a combine harvester 10 with a frame 12 supported on ground engaging wheels 14. A harvesting assembly in the forms of a harvesting platform 16 is used to harvest a standing crop and direct the harvested crop to a feeder house 18. The feeder house 18 is an inclined conveyor for conveying the harvested crop material into the interior of the combine 10. From the feeder house 18 the crop material is directed to a transverse beater 20. The beater 20 conveys the harvested crop material upward to an axial separating device 24 through an inlet transition region 22.

The axial separating device 24 threshes and separates the harvested crop material. The axial separating device 24 contains a rotor housing 38 and a rotor 39 arranged in the rotor housing 38. Grain and chaff drop onto a cleaning assembly 26 through grates on the bottom of the rotor housing 38. The cleaning system 26 removes the chaff and feeds the clean grain to a clean grain elevator, not shown. The clean grain elevator deposits the clean grain in a grain tank 28. The clean grain in the grain tank 28 can be unloaded into a trailer or truck by means of an unloading auger 30. Crop material other than grain that has been threshed and separated by the axial separating device 24 is directed to a discharge beater 34 through an outlet 32. The discharge beater 34 ejects the straw out the rear of the combine harvester 10.

The combine harvester 10 is operated from an operator's cab 36. A computer 46 that is connected to various sensors is also arranged in the cab 36.

A sensor 48 is arranged on the axial separating device 24. A sensor 50 is mounted on the frame 12 in the vicinity of the discharge beater 34. A sensor 52 is arranged above the inlet beater 20. Another sensor 54 is arranged on the frame 12 above the cleaning assembly 26. The sensors 48, 50 and 54 comprise generally known structure-borne noise sensors that sense sound waves which propagate in the elements on which the sensors are mounted. The sensor 52 consists of a microphone.

Due to its position, the sensor 48 primarily provides information on sound waves in the rotor housing 38 and vibrations caused by the rotating rotor 39. Part of these vibrations are caused by the material being processed in the axial separating device 24. Consequently, the signal of the sensor 48 contains information on the separation of the material being harvested in the rotor housing 38. The sensor 50 provides information on sound waves in the frame 12 which are caused by the rotation of the discharge beater 34 and the ejected material. The sensor 52 senses sound waves produced by the inlet beater 20 and the material conveyed therein. The sensor 54 that is mounted on the frame 12 and forms of a structure-borne noise sensor that provides information on vibrations and noises that propagate in the frame 12 and are caused by all movable elements of the combine harvester 10 and the material processed therein.

The sensors 48, 50, 52 and 54 are electrically (or optically) connected to the computer 46, preferably via a bus line. The computer 46 digitizes the analog signals of the sensors.

The computer 46 is connected to a sound reproduction device 58 in the form of a loudspeaker. The sound reproduction device 58 receives a mixture of the digitized signals of the sensors 48, 50, 52 and 54, wherein signals that correspond to a flawlessly operating combine harvester are suppressed. If the separating process is not optimally carried out, the operator hears a characteristic noise in the operator's cab 36 such that the operator is able to improve the adjustment of the material processing and material conveying elements of the combine harvester 10.

In addition, the computer 46 evaluates the signals of the sensors 48, 50, 52 and 54 and displays a value to the operator on a visual display device 56 in the operator's cab 36. This value contains information on the performance of the combine harvester 10, for example, the portion of lost grain which can be measured by means of the sensor 54 and a suitable baffle plate, onto which the lost grain drops. An error message also appears on the display device 56 if a defect is detected in the combine harvester 10 based on the sensor signals.

The monitoring device that is composed of the sensors 48, 50, 52, 54 and the computer 46 consequently allows a simple monitoring of the material flow in combine harvester 10 such that possible defects can be detected in a timely fashion.

Having described the preferred embodiment, it will become apparent that various modifications can be made without departing from the scope of the invention as defined in the accompanying claims.

What is claimed is:

1. A monitoring device for a harvesting machine having an operator's cab wherein harvested crop material is processed and flows through the harvesting machine having at least one sensor that is designed for generating a signal containing information on the noises caused by harvested crop material passing through the harvesting machine, wherein the sensor is arranged outside of the flow of harvested crop material and a sound reproduction device provided in the cab is able to acoustically reproduce signals derived by the sensor.

2. A monitoring device as defined by claim 1 wherein the sound reproduction device receives a signal that is derived from the signal of the sensor.

3. A monitoring device as defined by claim 1 wherein the sound reproduction device receives a filtered signal that is derived from the signal of the sensor.

4. A monitoring device as defined by claim 1 wherein the sound reproduction device receives a signal derived from the signal of the sensor that is superimposed with a comparative value of a signal.

5. A monitoring device as defined by claim 1 wherein a computer receives the signal of the sensor and is, based on the signal delivered by the sensor able to generate a value that is displayed on a visual display device.

6. A monitoring device as defined by claim 5 wherein the computer generates a control signal that is fed to an adjustable element of the harvesting machine.

7. A monitoring device as defined by claim 1 wherein a computer receives the signal of the sensor and is, based on the signal delivered by the sensor able to generate a control signal that is fed to an adjustable element of the harvesting machine.

8. A monitoring device as defined by claim 1 wherein a computer receives the signal from the sensor, the signal of the sensor is processed together with a comparative value of a correctly operating harvesting machine.

9. A monitoring device as defined by claim 8 wherein the comparative value is specifically selected for each respective type of crop being harvested.

10. A monitoring device as defined by claim 8 wherein the comparative values are sensed by the sensor and can be stored by the computer.

11. A monitoring device as defined by claim 1 wherein a computer receives the signal from the sensor, the signal of the sensor is processed together with a comparative value of a defectively operating harvesting machine.

12. A monitoring device as defined by claim 11 wherein the comparative value is specifically selected for each respective type of crop being harvested.

13. A monitoring device as defined by claim 11 wherein the comparative values are sensed by the sensor and can be stored by the computer.

14. A monitoring device as defined by claim 1 wherein the signal of the sensor also contains information on the movement of an element of the harvesting machine.

15. A monitoring device as defined by claim 14 wherein the signal of the sensor also contains information on the noises caused by the element of the harvesting machine.

16. A monitoring device as defined by claim 1 wherein the signal of the sensor also contains information on the noises caused by the element of the harvesting machine.

17. A monitoring device as defined by claim 1 wherein the sensor is designed for sensing noises caused by working elements that engage the flow of harvested crop material.

18. A monitoring device as defined by claim 17 wherein the sensor acts as a crop flow sensor.

19. A monitoring device as defined by claim 17 wherein the sensor comprises an acoustic sensor.

20. A monitoring device as defined by claim 19 wherein the sensor is designed for sensing structure-borne noise.

21. A harvesting machine for harvesting and processing an agricultural crop, the harvesting machine comprising:

a frame;

wheels supporting the frame;

a harvesting assembly for harvesting an agricultural crop;

a crop processing assembly for processing a harvested crop material, the harvested crop material forming a flow of harvested crop material through the crop processing unit as it is being processed;

an operator's cab from which the harvesting machine is controlled;

a monitoring device having at least one sensor that is designed for generating a signal containing information on the noises caused by the harvested crop material as it is processed by the crop processing assembly, the sensor being arranged outside of the flow of the harvested crop material and a sound reproduction device provided in the cab is able to acoustically reproduce signals derived by the sensor.

* * * * *